United States Patent
Nagai

(10) Patent No.: US 8,883,341 B2
(45) Date of Patent: Nov. 11, 2014

(54) BATTERY, VEHICLE MOUNTED WITH THE BATTERY, AND DEVICE MOUNTED WITH THE BATTERY

(75) Inventor: Hiroki Nagai, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 724 days.

(21) Appl. No.: 13/059,070

(22) PCT Filed: May 19, 2009

(86) PCT No.: PCT/JP2009/059154
§ 371 (c)(1),
(2), (4) Date: Feb. 15, 2011

(87) PCT Pub. No.: WO2010/134155
PCT Pub. Date: Nov. 25, 2010

(65) Prior Publication Data
US 2011/0183195 A1 Jul. 28, 2011

(51) Int. Cl.
*H01M 2/02* (2006.01)
*H01M 2/08* (2006.01)
*H01M 2/30* (2006.01)

(52) U.S. Cl.
CPC . *H01M 2/30* (2013.01); *Y02E 60/12* (2013.01)
USPC ............ 429/170; 429/171; 429/172; 429/181

(58) Field of Classification Search
USPC .................................. 429/170, 171, 172, 181
See application file for complete search history.

(56) References Cited

U.S. PATENT DOCUMENTS 8,283,067 B2 * 10/2012 Fujiya et al. .................. 429/178

(Continued)

FOREIGN PATENT DOCUMENTS

| CN | 2452138 | 10/2001 |
|---|---|---|
| CN | 1604356 | 4/2005 |
| CN | 1659053 | 8/2005 |
| JP | 38-3647 | 3/1963 |
| JP | 2001-140828 | 5/2001 |
| JP | 2003-173767 | 6/2003 |

(Continued)

OTHER PUBLICATIONS

International Search Report in International Application No. PCT/JP2009/059154; Mailing Date: Aug. 25, 2009.

*Primary Examiner* — Patrick Ryan
*Assistant Examiner* — Julian Anthony
(74) *Attorney, Agent, or Firm* — Finnegan, Henderson, Farabow, Garrett & Dunner, LLP

(57) ABSTRACT

A battery is provided with a base portion provided on the base end side of a columnar rivet portion. A terminal rivet is formed, on that surface of the base portion on which the rivet portion is located, with a sloped seat surface having a height which increases as one moves closer to the rivet section and provided at the entire circumference around the rivet section. The battery is also provided with an annular elastic member and a hard member having higher hardness than the elastic member and provided with a first hole having a diameter greater than the outer diameter of the elastic member and smaller than the outer diameter of the sloped seat surface. The terminal rivet is mounted such that the base portion and a current collecting part are located inside a battery case and such that the rivet portion penetrates through a hole in the battery case to project outward. The hard member is mounted such that the elastic member is located in the first hole and is sandwiched between the base portion and the battery case. When the rivet section is riveted, the elastic member is compressed in the thickness direction between the base portion and the battery case, and as a result, reliable sealing ability is maintained for a long period.

6 Claims, 5 Drawing Sheets

(56) References Cited

U.S. PATENT DOCUMENTS

2005/0093287 A1 5/2005 Kondo
2005/0095502 A1 5/2005 Sugimune et al.
2007/0039767 A1 2/2007 Kondo

FOREIGN PATENT DOCUMENTS

| JP | 2006-216411 | 8/2006 |
| JP | 2008-192552 | 8/2008 |
| WO | WO 2008/084883 A2 | 7/2008 |

* cited by examiner

BATTERY, VEHICLE MOUNTED WITH THE BATTERY, AND DEVICE MOUNTED WITH THE BATTERY

CROSS-REFERENCE TO RELATED APPLICATIONS

This is a national phase application based on the PCT International Patent Application No. PCT/JP2009/059154 filed on May 19, 2009, the entire contents of which are incorporated herein by reference.

TECHNICAL FIELD

The present invention relates to a battery including an electrode group housed in a battery case in a hermetically sealed manner while positive and negative external terminals are protruding out of the battery case. More particularly, the present invention relates to a battery in which a terminal rivet electrically connected to an external terminal is fixed to the battery case by riveting, a vehicle mounted with the battery, and a device mounted with the battery.

BACKGROUND ART

Heretofore, there has been used a sealed battery having an electrode group housed in a case in a hermetically sealed manner. The electrode group includes positive and negative electrode plates, electrolyte, etc. Positive and negative external terminals connected to the positive and negative electrode plates respectively are arranged to protrude outside through the through holes and others of the case. Each terminal is fixed to the through hole of the case by for example riveting a rivet-like member. Usually, a seal member is placed between a base portion of the rivet member and the case to seal the inside of the case.

For instance, Patent Literature 1 proposes an electrode structure in which a gasket is sandwiched between a base portion of a rivet member and a case (a cover). Patent Literature 2 discloses a structure that a protrusion is formed in a seat surface so that the protrusion bites into a seal member, thereby improving sealing ability. Further, Patent Literature 3 discloses an electrode structure that an annular protrusion is formed in a seal member. In this literature, the protrusion is compressed to make sure sealing.

CITATION LIST

Patent Literature

Patent Literature 1: JP 2008-192552 A
Patent Literature 2: JP 2003-173767 A
Patent Literature 3: JP 2006-216411 A

SUMMARY OF INVENTION

Technical Problem

However, in the above structure disclosed in Patent Literature 1, the base portion of the rivet member, the gasket, and the cover are in contact with each other through respective flat surfaces. This structure can maintain normal sealing ability for a long period under normal conditions. However, in case depressions or warps occur in the base portion of the rivet member during manufacture thereof, the sealing ability may deteriorate over time.

In the structures disclosed in Patent Literatures 2 and 3, stress is liable to concentrate on a specific portion of the seal member. Thus, cracks and breakage may occur in the seal member due to age deterioration. Accordingly, the sealing ability can be reliably provided in the short term but cannot be stably achieved in the long term.

The present invention has been made to solve the above problems and has a purpose to provide a battery including a structure of an electrode terminal capable of maintaining reliable sealing ability for a long term, a vehicle mounted with the battery, and a device mounted with the battery.

Solution to Problem

To achieve the above purpose, one aspect of the invention provides a battery comprising a battery case, an electrode group housed in the battery case in a hermetically sealed manner, and an external terminal electrically connected to an electrode body of the electrode group and exposed to outside of the battery case, wherein the battery comprises: a terminal rivet including a columnar rivet portion, a base portion provided at a base end of the rivet portion, and a current collecting part connected to the electrode body of the electrode group, a surface of the base portion provided with the rivet portion having a sloped seat surface with a height increasing toward the rivet portion and the raised seat surface being formed over an entire circumference of the rivet portion; an annular elastic member; and a hard member having higher hardness than the elastic member, the hard member being formed with a first hole having a diameter larger than an outer diameter of the elastic member and smaller than an outer diameter of the sloped seat surface, the battery case is formed with a second hole through which the rivet portion is inserted, the terminal rivet is placed such that the base portion and the current collecting part are located inside the battery case and the rivet portion passes through the second hole and protrudes out of the battery case, the hard member is placed so that the elastic member is located in the first hole and the hard member is sandwiched between the base portion and the battery case, the rivet portion is riveted so that the external terminal is fixed to the battery case and electrically connected to the terminal rivet, and the elastic member is compressed in a thickness direction between the base portion and the battery case.

According to the battery in the above aspect, the base portion of the terminal rivet is formed with the raised (sloped) seat surface having a height increasing toward the inner circumferential side. The elastic member is sandwiched between the base portion and the battery case and in the inner circumferential side than the hard member. The elastic member is located in a narrower place than the hard member in a thickness direction and thus is entirely compressed. Further, the raised seat surface of the base portion, contributes to smoothly increasing a compression amount of the elastic member toward the inner circumferential side. Accordingly, even when the seat surface of the base portion has been deformed or inclined slightly, good sealing ability can be maintained. In addition, no stress concentrates on any portion of the elastic member, so that the sealing ability can be reliably maintained for a long term.

In the above aspect of the invention, preferably, a difference in height between a portion of the sloped seat surface that contacts with a peripheral edge of the first hole and a portion of the sloped seat surface on a most inner circumference side is in a range of 0.001 mm to 0.2 mm.

When a compression amount of the elastic member is in the above range, the elastic member can maintain sufficient sealing ability and is less likely to be so deformed as to lose its elasticity.

Another aspect of the invention provides a vehicle comprising an electric motor to be driven to rotate wheels upon receiving supply of electric power and a power source for supplying the electric power to the motor, the power source including a battery mentioned above.

Further, another aspect of the invention provides a device comprising an operating part to be operated upon receiving supply of electric power and a power source for supplying the electric power to the operating part, the power source including a battery mentioned above.

Advantageous Effects of Invention

According to the battery, the vehicle and the device each mounted with the battery in the aforementioned aspects, an electrode terminal can be configured to maintain reliable sealing ability for a long term.

DESCRIPTION OF EMBODIMENTS

A detailed description of a preferred embodiment of the present invention will now be given referring to the accompanying drawings. In the present embodiment, the invention is applied to a flat-type lithium ion secondary battery.

Figure 1:
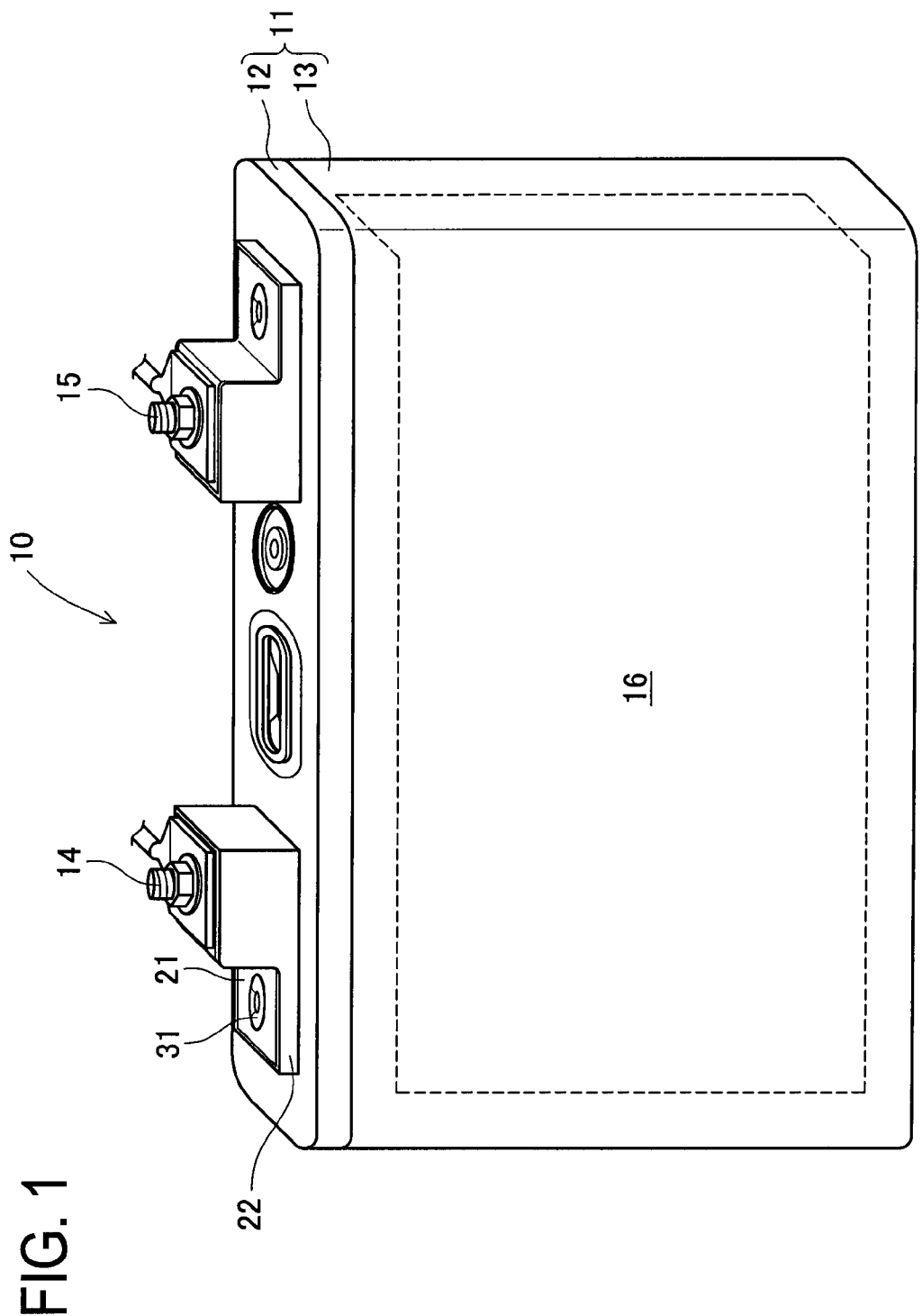
FIG. 1 is a partial cross-sectional view of a secondary battery in an embodiment.

A secondary battery 10 in the present embodiment is arranged such that a power generating element 16 is housed in a battery case 11 in a hermetically sealed manner as shown in FIG. 1. The battery case 11 includes a box-like main body 13 having one open end and a closing plate 12 for closing the open end. On the upper surface of the closing plate 12 in the figure, a positive terminal 14 and a negative terminal 15, each serving as an external electrode terminal, are attached to protrude therefrom. Those positive terminal 14 and negative terminal 15 are respectively connected to positive and negative electrode plates and others included in the power generating element 16.

Figure 2:
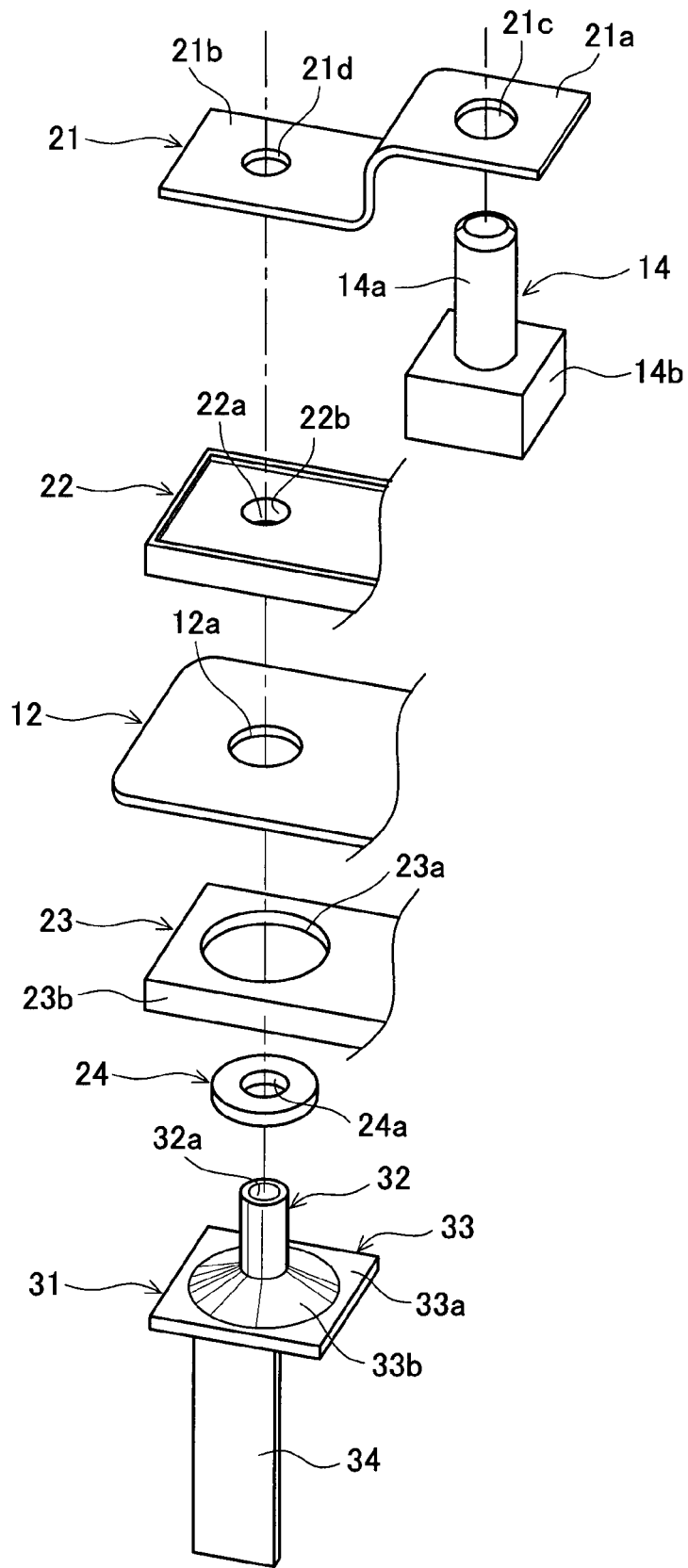
FIG. 2 is an exploded perspective view showing a riveting section in the embodiment.

An attaching section of the positive terminal 14 to the closing plate 12 in the present embodiment is explained referring to FIG. 2. FIG. 2 is an exploded view showing a state where the positive terminal 14 is not attached yet. An attaching section of the negative terminal 15 is almost symmetric to that of the positive terminal 14. The positive terminal 14 is attached to the closing plate 12 by use of an external terminal 21 which is a stepped metal member as shown in FIG. 2. This external terminal 21 is fixed to the closing plate 12 together with an insulation gasket 22, an insulation spacer 23, and a seal gasket 24 by a terminal rivet 31.

The positive terminal 14 includes, as shown in FIG. 2, a bolt portion 14a protruding outside and a base portion 14b having a larger diameter than the bolt portion 14a. The external terminal 21 includes an upper step portion 21a and a lower step portion 21b integrally formed in a stepped shape. The upper step portion 21a is formed with a through hole 21c through which the bolt portion 14a of the positive terminal 14 is inserted. The lower step portion 21b is formed with a through hole 21d through which the terminal rivet 31 is inserted. In this embodiment, the base portion 14b of the positive terminal 14 has an almost rectangular parallelepiped shape. The shape of the base portion 14b may be any shape not allowed to pass through the through hole 21c.

The insulation gasket 22, the closing plate 12, the insulation spacer 23, and the seal gasket 24 are provided with through holes respectively for insertion of the terminal rivet 31 as shown in FIG. 2. The insulation gasket 22, the closing plate 12, and the insulation spacer 23 are components each of which further continuously extends rightward from the illustrated range up to the position of the negative terminal 15. The seal gasket 24 is an annular member as illustrated.

As shown in FIG. 2, the insulation gasket 22 is formed with a through hole 22a and also a depression in the upper surface to receive the lower step portion 21b of the external terminal 21. The closing plate 12 is formed with a through hole 12a. An inner wall 22b (see FIG. 3) of the through hole 22a of the insulation gasket 22 extends downward in the figure enough to pass through the through hole 12a of the closing plate 12. The insulation spacer 23 is also formed with a through hole 23a having a relatively large diameter. The inner diameter of the through hole 23a is larger than the outer diameter of the seal gasket 24. The insulation spacer 23 is formed with an outer peripheral wall 23b extending downward in the figure.

The insulation gasket 22, the insulation spacer 23, and the seal gasket 24 are all insulating bodies. The insulation gasket 22 and the insulation spacer 23 are made of relatively hard synthetic resin. On the other hand, the seal gasket 24 is made of a softer and more deformable material than the gasket 22 and the spacer 23. For instance, an elastic body such as synthetic rubber is suitable. The seal gasket 24 is an annular component having an almost uniform thickness before attachment. The seal gasket 24 is formed with a through hole 24a. The thickness of this seal gasket 24 before attachment is almost equal to the thickness of a peripheral edge portion around the through hole 23a of the insulation spacer 23.

The terminal rivet 31 before riveting has a rivet portion 32, a base portion 33, and a current collecting part 34 as shown in FIG. 2. This rivet portion 32 has an almost columnar shape formed with a recess 32a at the center of an upper end in the figure. The rivet portion 32 is riveted by expanding this recess 32a. The base portion 33 is configured such that an almost rectangular flat plate portion 33a is provided with a truncated cone-shaped raised portion 33b centered about the rivet portion 32. The flat plate portion 33a is located substantially perpendicular to the rivet portion 32.

The current collecting part 34 is of an almost flat plate-like shape extending downward from one side of the flat plate portion 33a in FIG. 2. The shape of the flat plate portion 33a is not limited thereto and may be any shape firmly connected to the current collecting part 34. In the present embodiment, the current collecting part 34 is connected to a positive electrode plate of the power generating element 16 by for example welding within the battery case 11.

Figure 3:
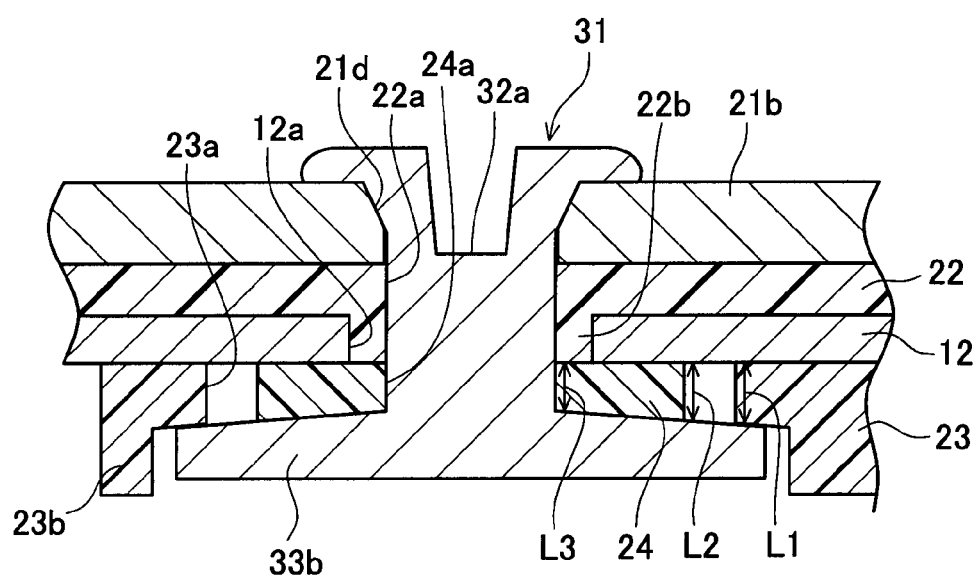
FIG. 3 is an end view of the riveting section.

FIG. 3 is a cross-sectional view of a riveting section of the above components after secured. The rivet portion 32 of the terminal rivet 31 is inserted, from below in the figure, in the through hole 24a of the seal gasket 24, the through hole 23a of the insulation spacer 23, the through hole 12a of the closing plate 12, the through hole 22a of the insulation gasket 22, and the through hole 21d of the lower step portion 21b of the external terminal 21. The rivet portion 32 is then riveted on the upper surface of the lower step portion 21b in the figure.

In the present embodiment, as shown in FIG. 3, the external terminal 21, the closing plate 12, and the terminal rivet 31 of the stacked components are conductive members such as aluminum. The lower step portion 21b of the external terminal 21 is in contact with the terminal rivet 31 in conductive relation. As mentioned above, furthermore, the current collecting part 34 of the terminal rivet 31 is connected to the positive electrode plate of the power generating element 16, so that the external terminal 21 is connected to the positive electrode plate of the power generating element 16 in the battery case 11 through the terminal rivet 31.

As shown in FIG. 2, since the external terminal 21 is connected to the positive terminal 14, the positive terminal 14 is connected to the positive electrode plate. Accordingly, the positive terminal 14 functions as a terminal of a positive electrode. The closing plate 12 is insulated from the terminal rivet 31 by the insulation gasket 22 and the seal gasket 24. The closing plate 12 is also insulated from the inside of the secondary battery 10 by the insulation spacer 23.

As shown in FIG. 3, the through hole 21d formed in the lower step portion 21b of the external terminal 21 has a funnel-like shape whose hole diameter gradually increases upward in the figure. Thus, the terminal rivet 31 can be riveted smoothly. A minimum inner diameter of the through hole 21d and an inner diameter of each of the through hole 22a of the insulation gasket 22 and the through hole 24a of the seal gasket 24 are determined to allow the rivet portion 32 of the terminal rivet 31 to just pass through those through holes.

In the present embodiment, furthermore, the outer diameter of the raised portion 33b is slightly larger then the inner diameter of the through hole 23a of the insulation spacer 23. As shown in FIG. 3, therefore, a peripheral portion around the through hole 23a of the insulation spacer 23 contacts with a peripheral edge portion of the raised portion 33b over the entire circumference. This ensures a distance between the lower surface of the closing plate 12 and an upper surface of the raised portion 33b of the terminal rivet 31 in the figure after riveting. Further, the terminal rivet 31 is prevented from being attached in an inclined posture with respect to the closing plate 12 and others. Alternatively, the insulation spacer 23 may be arranged to contact with the flat plate portion 33a.

The inner diameter of the through hole 23a of the insulation spacer 23 is larger than the outer diameter of the seal gasket 24. Accordingly, the seal gasket 24 is placed inside the through hole 23a of the insulation spacer 23 as shown in FIG. 3. In other words, the seal gasket 24 is positioned on the terminal rivet 31 at a portion that is closer to the rivet portion 32 and has a raised upper surface. At the portion of the terminal rivet 31 on which the seal gasket 24 is placed, the distance between the closing plate 12 and the terminal rivet 31 is shorter than the distance defined by the insulation spacer 23.

In the attached state shown in FIG. 3, the seal gasket 24 is entirely compressed in the thickness direction. The width of a space in a vertical direction in the figure between the lower surface of the closing plate 12 and the upper surface of the raised portion 33b is wider toward the outer peripheral side and narrower toward the inner peripheral side. This width of the space smoothly changes. Since the seal gasket 24 is an elastic member, the seal gasket 24 is placed easily in a compressed state to conform to the shape of the space. Thus, good sealing ability can be achieved.

The space in which the seal gasket 24 is placed includes no area having drastically changing shape, so that no stress concentration occurs on a specific portion of the seal gasket 24. The terminal rivet 31 is prevented from inclining by the insulation spacer 23 as above. Even when the rivet 31 is attached with a slight inclination within an allowable range, the sealing ability is maintained well. For the above arrangement, it is preferable that the lower surface of the inner wall 22b of the through hole 22a of the insulation gasket 22 in FIG. 3 is flush with the lower surface of the closing plate 12 in the figure.

In the space between the lower surface of the closing plate 12 and the upper surface of the raised portion 33b, the width of an area in which the peripheral portion around the through hole 23a of the insulation spacer 23 contacts with the closing plate 12 and the raised portion 33b is assumed as L1. This width is a dimension to be realized when the rivet portion 32 is to be riveted. The width of an area in which the outer peripheral edge of the seal gasket 24 contacts with the closing plate 12 and the raised portion 33b is assumed as L2. In the present embodiment, as shown in FIG. 3, a relation of $L1 \geq L2$ is provided over the entire circumference. Specifically, the seal gasket 24 is surely compressed in the thickness direction over its entire circumference.

Furthermore, as shown in FIG. 3, the seal gasket 24 is compressed gradually more strongly toward the inner peripheral side. The width in an area of the space having a minimum width, that is, in an area in which the seal gasket 24 contacts with the rivet portion 32, is assumed as L3. At this area, the seal gasket 24 is compressed most strongly. The original width of the seal gasket 24 is equal to that of the peripheral portion around the through hole 23a of the insulation spacer 23, i.e., almost equal to L1. The compression amount of the seal gasket 24 is preferably determined in the following range:

$$0.001 \text{ mm} \leq L1-L2 \leq L1-L3 \leq 0.2 \text{ mm}$$

Since the seal gasket 24 is an elastic member, a portion thereof compressed to some extent can ensure sealing ability. On the other hand, if it is held as compressed too strongly for a long period, the elasticity is lost, decreasing the sealing ability. In the present embodiment, the compression amount is determined as above, so that the sealing ability can be maintained for a long period of time.

According to the secondary battery 10 in the present embodiment explained in detail above, the raised portion 33b having a truncated cone shape centered about the rivet portion 32 is provided on the flat plate portion 33a of the terminal rivet 31. Further, the relatively hard insulation spacer 23 contacts with the raised portion 33b on the outer circumferential side thereof and the seal gasket 24 which is an elastic member is held on the raised portion 33b on the inner circumferential side thereof. Accordingly, the seal gasket 24 is smoothly compressed along the shape of the raised portion 33b. Thus, no stress concentration occurs on a specific portion of the seal gasket 24 which is an elastic member. The reliable sealing ability can therefore be maintained for a long term.

Figure 4:
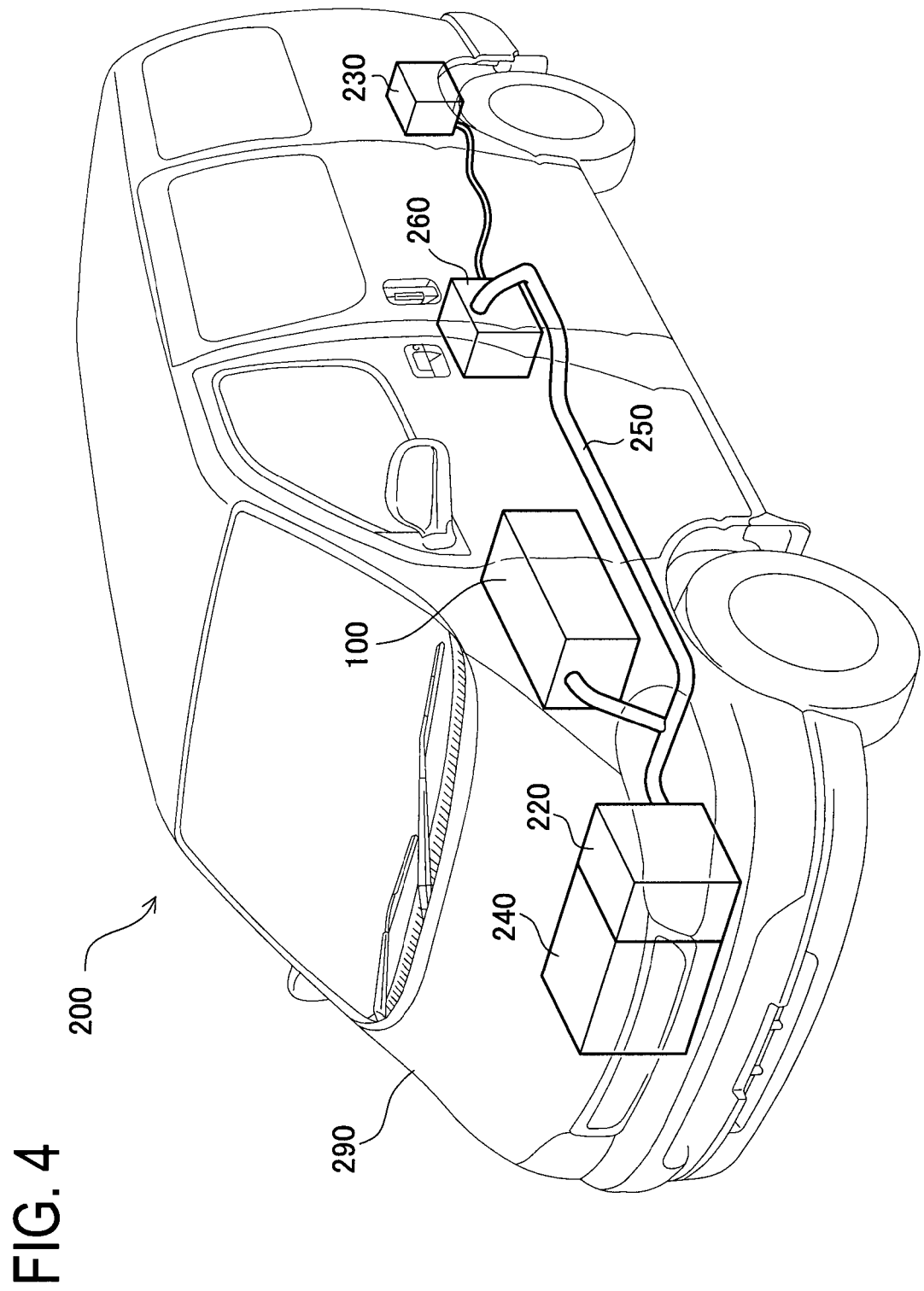
FIG. 4 is an explanatory view showing an example of a vehicle mounted with a secondary battery.

The secondary battery 10 in the aforementioned embodiment can be combined in plurality as an assembled battery, which can be mounted in a vehicle. An example of such vehicle is shown in FIG. 4. This vehicle 200 is a hybrid vehicle that drives wheels by a combination of an engine 240, a front electric motor 220, and a rear electric motor 230. This vehicle 200 includes a vehicle body 290, the engine 240, the front electric motor 220 attached to the engine 240, the rear electric motor 230, a cable 250, an inverter 260, and an assembled battery 100 containing a plurality of the secondary batteries 10. Electric power is supplied from the assembled battery 100 to the front electric motor 220 and the rear electric motor 230 through the inverter 260.

The vehicle may be any vehicle using electric energy of the battery in the whole or part of its power source. For instance, the vehicle may be an electric vehicle, a plug-in hybrid vehicle, a hybrid railroad vehicle, a forklift, an electric-driven wheel chair, an electric bicycle, an electric scooter, etc.

Figure 5:
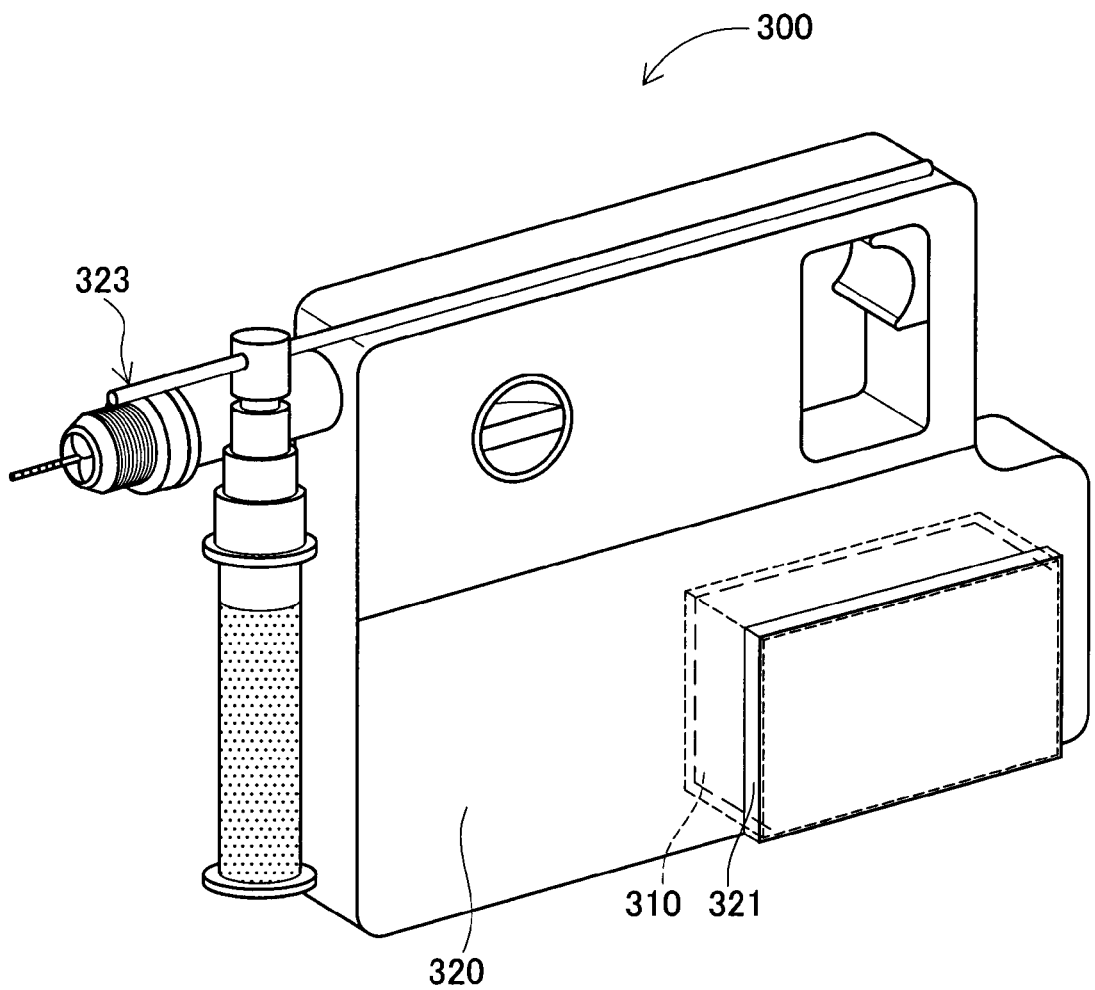
FIG. 5 is an explanatory view showing an example of a hammer drill mounted with a secondary battery.

The secondary battery 10 in the aforementioned embodiment can be mounted on various electric devices. One example of such electric devices, a hammer drill, is shown in FIG. 5. This hammer drill 300 is mounted with a battery pack 310 including the aforementioned secondary battery 10. The hammer drill 300 is a battery-mounting device having the battery pack 310, a main body 320, and an operating part 323. Electric power is supplied from the battery pack 310 to the operating part 323. It is to be noted that the battery pack 310 is removably accommodated in a bottom part 321 of the main body 320 of the hammer drill 300.

The battery-mounting device may be any device mounted with a battery and arranged to utilize this battery as at least one of energy sources. For instance, the device may be any one of various battery-driven home electric appliances, office equipment, and industrial equipment such as a personal computer, a cell phone, a battery-driven electric tool, an uninterruptible power supply system.

The embodiment is a mere example and does not give any limitations to the present invention. The present invention therefore may be embodied in other specific forms without departing from the essential characteristics thereof.

For instance, all the shapes of the rivet portion 32, the lower surface of the base portion 33, and the current collecting part 34 of the terminal rivet 31 are mere examples and are not limited to the above mentioned ones. The lower surface of the base portion 33 does not always need to be flat and the current collecting part 34 does not always need to have a flat plate shape. In this embodiment, the present invention is applied to the positive terminal 14 but of course may be applied to a negative terminal.

REFERENCE SIGNS LIST

10 Secondary battery
11 Battery case
12 Closing plate
12a Through hole
14 Positive terminal
16 Power generating element
23 Insulation spacer
23a Through hole
24 Seal gasket
31 Terminal rivet
32 Rivet portion
33 Base portion
33b Raised portion
34 Current collecting part
200 Vehicle
300 Hammer drill

The invention claimed is:

1. A battery comprising a battery case, an electrode group housed in the battery case in a hermetically sealed manner, and an external terminal electrically connected to an electrode body of the electrode group and exposed to outside of the battery case, wherein
the battery comprises:
a terminal rivet including a columnar rivet portion, a base portion provided at a base end of the rivet portion, and a current collecting part connected to the electrode body of the electrode group, a surface of the base portion provided with the rivet portion having a sloped seat surface with a height increasing toward the rivet portion and the raised seat surface being formed over an entire circumference of the rivet portion;
an annular elastic member; and
an insulation spacer having higher hardness than the elastic member, the insulation spacer being formed with a first hole having a diameter larger than an outer diameter of the elastic member and smaller than an outer diameter of the sloped seat surface,
the battery case is formed with a second hole through which the rivet portion is inserted,
the terminal rivet is placed such that the base portion and the current collecting part are located inside the battery case and the rivet portion passes through the second hole and protrudes out of the battery case,
the insulation spacer is placed so that the elastic member is located in the first hole and the insulation spacer is sandwiched between the base portion and the battery case,
the rivet portion is riveted so that the external terminal is fixed to the battery case and electrically connected to the terminal rivet, and
the elastic member is compressed in a thickness direction between the base portion and the battery case.

2. The battery according to claim 1, wherein
a difference in height between a portion of the sloped seat surface that contacts with a peripheral edge of the first hole and a portion of the sloped seat surface on a most inner circumference side is in a range of 0.001 mm to 0.2 mm.

3. A vehicle comprising an electric motor to be driven to rotate wheels upon receiving supply of electric power and a power source for supplying the electric power to the motor, the power source including a battery set forth in claim 1.

4. The vehicle according to claim 3, wherein a difference in height between a portion of the sloped seat surface that contacts with a peripheral edge of the first hole and a portion of the sloped seat surface on a most inner circumference side is in a range of 0.001 mm to 0.2 mm.

5. A device comprising an operating part to be operated upon receiving supply of electric power and a power source for supplying the electric power to the operating part, the power source including a battery set forth in claim 1.

6. The device according to claim 5, wherein a difference in height between a portion of the sloped seat surface that contacts with a peripheral edge of the first hole and a portion of the sloped seat surface on a most inner circumference side is in a range of 0.001 mm to 0.2 mm.

* * * * *